April 24, 1934.      E. R. EDSON      1,956,064
COLD WATER SOLUBLE ADHESIVE AND METHOD OF MAKING IT
Filed May 7, 1930
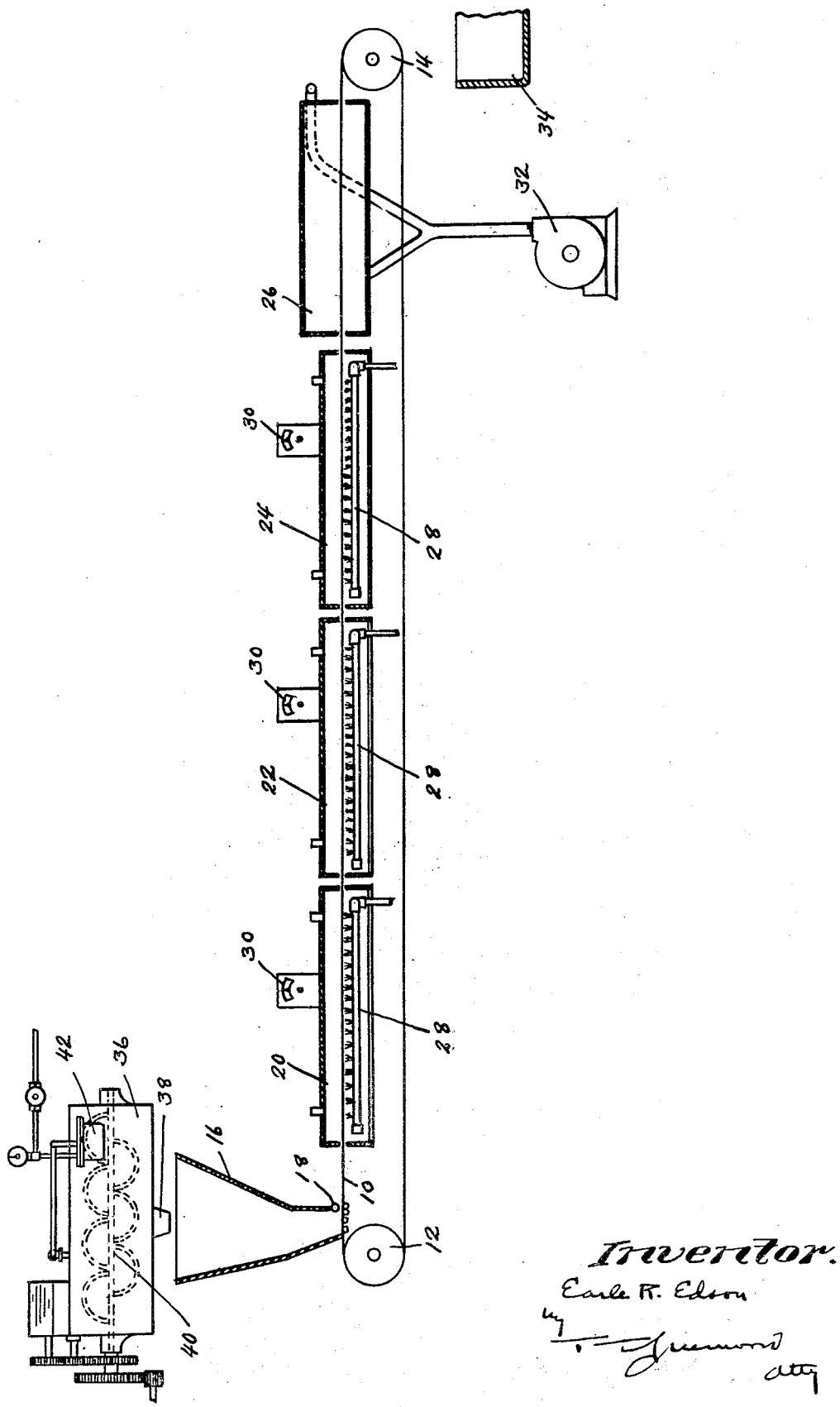
Inventor.
Earle R. Edson Patented Apr. 24, 1934

1,956,064

UNITED STATES PATENT OFFICE 1,956,064

COLD WATER SOLUBLE ADHESIVE AND METHOD OF MAKING IT

Earle R. Edson, Gloucester, Mass., assignor to Russia Cement Company, Gloucester, Mass., a corporation of Massachusetts Application May 7, 1930, Serial No. 450,403

17 Claims. (Cl. 87—17)

This invention relates to a cold water soluble adhesive made from starch and the process of making the same.

Many attempts have been made to produce an adhesive from starch which is readily combined with the amount of water at ordinary temperatures proper for mixtures of the required proportions so as to be held in solution or suspension or emulsion, and these attempts have been more or less successful. The difficulty has been that in cold water the granules of the adhesive "ball up", that is, stick together forming a large bunch which goes into solution too slowly for the desired result. For this reason prior patents referring to cold water soluble adhesives must be taken in a relative sense as referring to compounds more readily soluble than those before known and not compounds entirely cold soluble at once. Nevertheless for many years cold water soluble adhesives have been made, as described by Kantorowicz, Patent No. 1,105,567, issued July 28, 1914, for instance, by using a liquid solution of starch mixed with proper materials and pouring the mixture onto hot rolls on which it dries and from which the dry product is removed by a scraper. This scraper not only removes the product from the roll but in so doing usually causes it to break up into small fragments. It may, however, form a sheet which must be ground. The original starch cells are ruptured by this treatment and the product consists of fine fragments resembling thin broken glass. This product ground to the required fineness is good for many purposes.

The cold water soluble adhesive with which the present invention is concerned is readily distinguished from the metal roll product of Kantorowicz. It is much easier to place in suspension. It consists of a dry powder in which, under the microscope, the individual starch cells appear in their original form physically intact substantially except for some increase in size but changed by their modification to the desired extent by suitable chemicals.

I think it probable that the preservation of nearly all the original starch cells in their original form, though dextrinized and modified as desired, is a matter of great importance. Cold water soluble adhesive made by former methods, involving the solution, cooking, drying and grinding of the adhesive, consists of irregular particles like crushed stone which are difficult to prepare so that the granules will not tend to lock together when immersed in water and will have uniform properties throughout a batch or be uniform in different batches designed to be identical.

My method of making a cold water adhesive is to so select the materials and amounts thereof used as to produce the desired qualities in the adhesive product and so carry on the process that the original starch cells are not, to a harmful extent dissolved by liquids or burst open by heat or otherwise destroyed.

In carrying out my method, I prefer to use the belt machine described in a copending application of N. Carleton Phillips, Serial No. 412,614, filed December 9, 1929, now Patent No. 1,894,570, dated January 17, 1933, and assigned to the assignee of the present application and which consists essentially of an endless travelling metal belt on which impregnated dry starch may be carried in thin layers of uniform thickness exposed to a controlled heating and if needed, cooling. I do not confine myself to the use of this machine, however, as other apparatus for re-roasting the dextrinized product may be used.

As is well known, many flours may be used and many materials may be used to treat the flour according to the qualities desired in the adhesive. A highly satisfactory cold soluble adhesive may be made as follows:—

My general method is to take a starch dextrinized to the desired extent by any method which preserves substantially the original physical starch cells. I use the term "dextrinization" broadly to include the modification of starch by heat alone which results in the formation of British gum as well as the modification by acid and heat and the other methods which produce dextrinization in the more limited sense. Cold water soluble adhesives may be made from a starch modified in either way by my method. The dextrinization should preferably be very uniform. This can in practice be done commercially on the travelling belt above referred to and not very satisfactorily in any other way known to me. I treat this partially or wholly dextrinized material with the ingredients necessary to produce the required qualities in the product and leave the material in a dry or moist state but not dissolved. I use alkaline compounds so as not to have the mixture acid, some compound or compounds of borax, such as a sodium borate, sodium perborate, and sodium carbonate. The treated material is then heated under proper conditions preferably as a thin sheet on the travelling belt of the machine above referred to, whereupon it is converted to a finished product having the characteristics desired.

Those skilled in the art will adjust the amount and character of the modifying materials to the desired characteristics of the product which vary widely according to the purposes for which they are to be used. I can make an adhesive readily soluble in one-half part of water or, one which will give a viscous and adhesive solution with six parts of water. This variation is produced by a variation of material, heat of roasting and duration of the process.

My invention I believe to be novel in many features.

I treat a starch dextrinized in whole or in part with a combination of materials alkaline in effect and without bursting or destroying the original starch cells materially.

I roast the treated dextrinized starch without destroying materially the starch cells.

I perform the operation preferably on a traveling belt on which the material is maintained in a thin layer uniform in thickness so that each particle receives uniform treatment.

I produce an adhesive readily and easily dispersible in cold water which readily goes into solution and has the predetermined viscosity and is substantially uniform in its properties throughout the batch and which can be duplicated in successive batches or varied accurately in a predetermined manner in successive batches.

In this specification the term "dextrinized starch" includes starch of any desired degree of dextrinization.

The figure is a more or less diagrammatic longitudinal sectional elevation of the apparatus of the above identified application utilized to prepare the cold water soluble adhesive with which the present invention is concerned.

The apparatus includes an endless horizontal travelling belt 10 which extends between and is supported by the large end rollers 12 and 14, the roller 14 being driven by suitable mechanism, not herein shown, so that the upper pass of the belt is moved from the roller 12 to the roller 14 at a constant rate of speed which can be varied to suit the particular requirements of the product. The belt preferably is composed of thin flexible metal as steel, and, in the particular apparatus used, is approximately two feet wide and the length of the upper or material supporting pass of the belt is approximately fifty feet. The belt, however, is not necessarily limited to these specific dimensions. A hopper 16 which is adapted to contain a quantity of the material to be converted is located at one end of and above the upper pass of the belt near the roller 12, and has means including a vertically adjustable roller 18 located at the exit slot of the hopper arranged to deposit a thin continuous layer of uniform thickness of material and regulated density on the upper pass of the belt.

The material to be converted is mixed with a suitable modifying or converting material or materials in a mixing device or chamber 36 which is disposed above the hopper 16 and has an outlet conduit 38 in the bottom thereof that opens into the top of the hopper. The mixing device contains a power driven agitator 40 which is arranged to agitate a charge of the material in the chamber and thoroughly and uniformly mix it with the modifying materials that are added thereto. The thoroughly mixed material is then passed into the hopper where it is deposited in a thin sheet or ribbon form on the belt in the manner above described.

The belt passes the layer of material to be converted through an oven consisting of three sections 20, 22, 24 and thence through a cooling section 26, if such is necessary, all arranged in the order illustrated. The oven sections 20, 22, 24 are heated preferably by gas burners 28 and means including thermostats 30, one of which is located at each section and is influenced by the temperature thereof, are provided to control the supply of fuel to the oven sections and thus to maintain the temperatures of the sections automatically at any desired value for which the thermostats are set. Usually the temperatures of the sections will be different. Any thermostat which controls the supply of fuel to the burners 28 according to the temperature of the oven sections will do. I have used the well-known "Tycos" thermostat which has a bulb containing an expansible fluid located in an oven section. The fluid in the bulb controls the position of a contact arm in the temperature indicating part 30 of the thermostat, which arm controls the circuit of an electric motor, not shown, that opens and closes a valve that controls the supply of gas to a burner 28. A similar thermostat is associated with each oven section. The ovens are so arranged that the layer or ribbon of material is heated from the top and also from the bottom by the heated gases, the heat passing into the bottom of the layer through the metal belt. The cooling chamber 26 is provided with circulating cool air by means including a blower 32 so as to cool the converted material as it comes from the last oven section and to check any further conversion or overroasting that might take place due to the stored heat in the material. The converted material leaves the top pass of the belt where it turns over the roll 14 and the material falls into a suitable receptacle 34.

In preparing my cold water soluble adhesive, I first prepare or procure a suitable starch dextrinized preferably as above stated by the use of the above described machine. For example, a suitable grade of starch flour, as a grade known as "Royal", is acidified preferably by diluted hydrochloric acid in the mixing device in the proportions of twelve hundred pounds of flour to twelve ounces of hydrochloric acid of standard strength diluted with sixty ounces of water. The acid can be sprayed into the mixing device under air pressure from the acid container 42 while the charge of flour is undergoing agitation so that the acid may be distributed intimately and equally throughout the charge of flour. The amount of acid and water is so small in proportion to the amount of flour that the charge of flour thus treated is apparently dry. The treated flour is then introduced into the hopper 16 and deposited in a thin continuous sheet of uniform thickness and density, say "one-eighth" inch in thickness, under the top pass of the conveyor belt and passes at uniform speed, say "one hundred" inches per minute, through the oven sections. The temperatures of the ovens are adjusted as desired for preparing a dextrinized starch which is adapted to be converted to a cold water soluble adhesive having certain selected properties. The temperature in the first oven section can be 300°; in the second oven section, 390°; and in the third oven section, 410°, all Fahrenheit, although these temperatures can be varied to vary the degree of dextrinization. In passing through these ovens, the starch becomes dextrinized but not completely unless the conditions above stated are varied by greater heat or slower belt speed. The starch then passes through the cooling chamber and is deposited in a suitable receptacle. By this process, the starch cells remain intact and are not destroyed or disrupted and the product exists as a flour.

The dextrinized starch is then treated with modifying materials, preferably alkaline in effect, which, when the treated dextrinized starch is heated as directed, render it cold water soluble and suitable for the purposes for which it is to be used and is again passed through either the same machine or a similar one for conversion into a form wherein it is readily soluble or dispersible with cold water. For example, a charge of the starch dextrinized as above described is placed in the mixing device and is agitated with a certain amount of water. For a charge of fourteen hundred pounds of dextrinized starch, eighteen gallons of water can be added, the water being preferably added in small amounts while the charge of material is undergoing agitation. This amount of water only makes the powder or flour moist. Subsequently certain amounts of sodium borate, sodium perborate, and sodium carbonate are added to the moistened material. For the amount of material above mentioned, the proportion of these materials can be as follows: sodium borate, 230 pounds; sodium perborate, 10 pounds; and sodium carbonate, 60 pounds. These several materials are mixed with the moistened dextrinized starch in the mixing device until an intimate mixture obtains. The mixture is then introduced into the hopper 16 and is laid as a thin continuous sheet of uniform thickness and density, say "one-eighth" inch in thickness, on the top pass of the conveyor belt, where it passes in succession at uniform speed through the various ovens for conversion, and, if necessary, also through the cooling chamber from which it falls or is scraped off the belt and is deposited in a convenient receptacle 34. Usually the temperatures of the oven sections during the second treatment will be different from the temperatures found desirable for dextrinizing the starch. The first oven section may have a temperature of 200°, the second oven, 250°, and the third oven, 260°, all Fahrenheit. During the progress of the material through the ovens, the material becomes heated and converted into a product which is readily soluble in or dispersible with cold water. The material delivered from the belt is then if lumpy broken up with rapid agitation such as would be the case if placed in a powerful mixing machine or on a rapidly moving screen to separate such cells as may be adherent so as to restore the material to its original powder or flour form. I prefer that little or no further dextrinization should take place during the second treatment. The cellular structure of the material remains intact except that there may be some enlargement of the cells.

It is important, though not absolutely necessary for all products, that the desired degree of dextrinization be obtained during the first roast or heat treatment. This may be very accurately predetermined not only as to different parts of the same batch, but as to different batches by care in maintaining uniformity of conditions of the reaction. The product of the first step of the process should be tested carefully to make sure that it has been dextrinized to the desired extent and no more. Various tests for this are well known. I have found the product of different batches and different parts of the same batch to be almost identical where reasonable care is used in the first roasting. For uniformity of the final product there should be no further dextrinization during the second roasting.

The extent of dextrinization should be varied according to the product desired. The dextrinization produced by the use of the materials and conditions suggested as example in the first treatment is, roughly speaking, about half complete and makes a highly satisfactory cold water soluble adhesive when given the second treatment above referred to. Increased dextrinization is obtained by more heat, less speed, thinner layers, different flour and other well known ways.

The modification of the adhesive gives very different results according to the extent of dextrinization of the materials by the first roast. If dextrinization takes place during the second roast the product can not be predicted accurately enough for many modern requirements. By my process, however, the properties of the final adhesive in different batches and different parts of the same batch may be very closely predetermined. It is well known that a slightly dextrinized material will produce a cold water soluble adhesive which will take up a large amount of water without separation and that a material very completely dextrinized is less ready to take up a large amount of water. But for many purposes the material which will not take up much water is better for other reasons. Hence the materials used, temperatures, belt speeds, thickness and density of layer on the belt should be varied according to the product desired. Such variations are included in my invention if included within my claims.

The ideal as to thickness of layer and belt speed would be a layer the thickness of one starch cell run at very high speed on a short belt subjected to high temperature. I have used successfully various speeds. A layer one-eighth of an inch thick run at one hundred inches per minute for the first roast and at one hundred twenty inches per minute for the second roast works very well. Greater production is possible but much higher speeds and thicker layers and higher temperatures involve more danger of an inferior product if any variation from the predetermined thickness, speed or temperature occurs. A much lower speed and a thicker layer can be used successfully but I do not advise it.

It is difficult to state whether the result of placing the cold water soluble adhesive in water is a true or a colloidal solution or emulsion or whether the material is merely suspended in water. The term "cold water soluble" has long been used as to adhesives to include any kind of dispersion which follows stirring up the material in cold water and causes the material to be dispersed substantially completely in a manner suitable for the ordinary uses of such adhesives and I have so used the term in this specification except where the context otherwise requires.

I claim:

1. The method of making an adhesive readily dispersible in cold water which consists in treating a dextrinized starch in which the starch cells are practically unbroken with a borax compound and sodium carbonate and roasting the same without disrupting the original starch cells by conveying the treated starch in a uniform layer free from cell-destroying amounts of liquid at uniform speed through a heat-controlled atmosphere.

2. The method of making an adhesive readily dispersible in cold water which consists in treating a dextrinized starch in which the starch cells are practically unbroken with alkaline modifying materials of the nature of sodium borate and sodium carbonate and roasting the same without disrupting the original starch cells by forming a thin continuous layer of uniform thickness of the treated material, and conveying the layer free from cell-destroying amounts of liquid at uniform speed through a heat-controlled atmosphere.

3. The method of making an adhesive readily dispersible in cold water which consists in treating a dextrinized starch in which the starch cells are practically unbroken with sodium borate and sodium carbonate and roasting the same without disrupting the original starch cells by conveying a thin continuous layer of uniform thickness of the treated material free from cell-destroying amounts of liquid, and subjecting all portions of the layer to the same amount of heat for the same length of time.

4. The method of making an adhesive readily dispersible in cold water which consists in treating a dextrinized starch in which the starch cells are practically unbroken with sodium borate and sodium carbonate and water to an amount sufficient only to moisten the starch and thus to preserve practically intact the original starch cells, and roasting the treated material without disrupting the original starch cells.

5. The method of making an adhesive readily dispersible in cold water which consists in treating a dextrinized starch in which the starch cells are practically unbroken with sodium borate and carbonate and water to an amount sufficient only to moisten the starch and thus to preserve practically intact the original starch cells, and subjecting the treated material uniformly to the same elevated temperature for the same time without destroying the cells of the material.

6. The method of making an adhesive readily dispersible in cold water comprising treating starch with a dextrinizing material and roasting the treated starch to dextrinize it, and treating the dextrinized starch further with sodium borate and carbonate and water in such small amounts as only to moisten the dextrinized starch and roasting the treated dextrinized starch at a lower temperature than the first roast which will modify the material so as to be soluble in cold water and adhesive without further dextrinizing it.

7. The method of making an adhesive readily dispersible in cold water which consists in roasting practically dry starch containing a modifying material to an elevated controlled temperature for a controlled time sufficient to effect dextrinization of practically all the starch cells to the same degree and treating the dextrinized starch with sodium borate and carbonate including water to an amount sufficient only to moisten the starch and thus to preserve practically intact the original starch cells, and roasting the same by subjecting the cells all to the same elevated temperature for the same time.

8. The method of making an adhesive readily dispersible in cold water which consists in roasting practically dry starch containing a dextrinizing material to an elevated controlled temperature for a controlled time sufficient to effect dextrinization of practically all the starch cells to the same degree, and preserving intact the original starch cells, and treating the dextrinized starch with sodium borate and carbonate including water to an amount sufficient only to moisten the starch and thus to preserve practically intact the original starch cells, and roasting the same without disrupting the original starch cells.

9. The method of making an adhesive readily dispersible in cold water which consists in roasting practically dry starch containing a dextrinizing material to an elevated controlled temperature for a controlled time sufficient to effect dextrinization of practically all the starch cells to the same degree, treating the dextrinized starch with modifying materials comprising sodium borate and carbonate, which includes water in an amount which is less than that required to disrupt the starch cells, whereby to preserve them intact, and roasting the treated dextrinized starch by subjecting the cells to the same elevated temperature for the same time and without disrupting the cells.

10. The method of making a cold water soluble adhesive which consists in mixing a powdered starch with acid suitable to assist dextrinization, forming the mixture into a layer of uniform thickness and dextrinizing it uniformly by heat to the desired extent, mixing the dextrinized product while still in powder form with a borax compound and sodium carbonate, forming the powder into a layer of uniform thickness and reheating it to a uniform extent not sufficient to cause further dextrinization, the entire process being carried out without disrupting the original starch cells.

11. A cold water soluble adhesive comprising a dextrinized starch that has its original starch cells preserved intact.

12. A cold water soluble adhesive comprising discrete particles of a dextrinized starch in which the original starch cells are preserved intact.

13. An adhesive that is readily dispersible in cold water and that comprises a dextrinized starch wherein the original starch cells are preserved intact.

14. A cold water soluble adhesive that comprises a dextrinized starch in particles that preserve the original starch cells and that are independently dispersible in cold water without material tendency to adhere together.

15. An adhesive consisting of starch cells unbroken but dextrinized and modified by sodium carbonate in which a borax derivative is present and characterized by being cold water soluble.

16. An adhesive consisting of starch cells unbroken but dextrinized and modified by sodium carbonate in which a borax derivative is present into a form wherein the starch cells are characterized by being cold water soluble and by having each cell unbroken.

17. The method of making an adhesive that is readily dispersible in cold water, which method comprises dextrinizing starch while in powder form without disrupting the starch cells, treating the dextrinized starch with sodium borate, sodium perborate and sodium carbonate, and heating the treated dextrinized starch uniformly and without disrupting the cells.

EARLE R. EDSON.